United States Patent
Schreiber

(10) Patent No.: US 9,041,990 B2
(45) Date of Patent: May 26, 2015

(54) DEVICE FOR VARIABLE DEFLECTION OF LIGHT

(75) Inventor: Frank Schreiber, Dossenheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 279 days.

(21) Appl. No.: 13/559,111

(22) Filed: Jul. 26, 2012

(65) Prior Publication Data

US 2013/0033734 A1 Feb. 7, 2013

(30) Foreign Application Priority Data

Aug. 1, 2011 (DE) .......................... 10 2011 052 336

(51) Int. Cl.
  *G02B 26/08* (2006.01)
  *G02B 21/00* (2006.01)
  *G01J 3/02* (2006.01)
  *G01J 1/04* (2006.01)

(52) U.S. Cl.
  CPC ............. *G02B 21/0076* (2013.01); *G01J 3/021* (2013.01); *G02B 26/0833* (2013.01); *G01J 1/0414* (2013.01)

(58) Field of Classification Search
  CPC .. G02B 26/0833; G02B 6/3512; G02B 26/00; G02B 26/8041; G02B 6/3518; G02B 21/0076; H04Q 2011/003; G01J 1/0414; G01J 3/021
  USPC ...................... 359/198.1–199.4, 201.1, 201.2, 359/224.1–224.2, 298, 850, 857, 861, 866; 385/16, 18
  See application file for complete search history.

(56) References Cited

U.S. PATENT DOCUMENTS

| | | | |
|---|---|---|---|
| 6,396,053 B1 | 5/2002 | Yokoi | |
| 6,749,346 B1 * | 6/2004 | Dickensheets et al. | ......... 385/88 |
| 7,372,603 B2 * | 5/2008 | Cho et al. | .................. 359/201.1 |
| 7,813,601 B2 | 10/2010 | Powell | |
| 2002/0034356 A1 | 3/2002 | Tew | |
| 2002/0044722 A1 | 4/2002 | Tew | |
| 2002/0076138 A1 | 6/2002 | Tew | |
| 2003/0058520 A1 | 3/2003 | Yu et al. | |

FOREIGN PATENT DOCUMENTS

| | | |
|---|---|---|
| DE | 4330347 A1 | 3/1995 |
| DE | 19835072 A1 | 2/2000 |
| DE | 10038049 A1 | 2/2002 |
| WO | 2009/015139 A2 | 1/2009 |

* cited by examiner

*Primary Examiner* — James Phan
(74) *Attorney, Agent, or Firm* — Patentbar International, P.C.

(57) ABSTRACT

A device (100) for variable deflection of light is described, encompassing a micromechanical mirror arrangement (14) having a plurality of light-reflecting mirror actuators (18, 20, 22, 24, 26), and a control unit (32) with which the mirror actuators (18, 20, 22, 24, 26) are controllable into different reflection positions in order to vary the light deflection. The device (100) has a back-reflection structure (60), systematically adapted to the mirror arrangement (14), for reflecting back onto another portion of the mirror actuators (18, 20, 22, 24, 26), in targeted fashion, the light reflected onto the back-reflection structure (60) from one portion of the mirror actuators (18, 20, 22, 24, 26).

18 Claims, 3 Drawing Sheets

DEVICE FOR VARIABLE DEFLECTION OF LIGHT

RELATED APPLICATIONS

This application claims priority to German Patent Application No. DE 10 2011 052 336.7, filed Aug. 1, 2011, which is incorporated herein by reference in its entirety.

FIELD OF THE INVENTION

The invention relates to a device for variable deflection of light encompassing a micromechanical mirror arrangement having a plurality of light-reflecting mirror actuators, and a control unit with which the mirror actuators are controllable into different reflection positions in order to vary the light deflection.

BACKGROUND OF THE INVENTION

Devices that make possible, at the end of the imaging beam path, a selective detection of individual spectral components of the detected light are often provided in microscopy, in particular confocal microscopy. Beam splitters are often used for this; these transmit a specific spectral component of the light while reflecting the other spectral components. The result is that, for example, the fluorescent radiation emitted from a sample being imaged can be selectively detected.

An alternative possibility for selective light detection is to pass the detected light firstly through a dispersing optical element, e.g. a prism, which refracts the detected light in wavelength-dependent fashion and thereby generates a spectrally dispersed, diverging light bundle. This light bundle is then delivered to a mirror slider apparatus that is constituted from multiple cascades of mirrors. Each of these mirror cascades is made up of two mirror elements that are separated from one another by a gap. A portion of the spectrally split light bundle passes through this gap, while the remaining portion of the light bundle is reflected at the mirror elements onto a further mirror cascade that in turn directs a specific spectral component onto another detector.

A mirror slider apparatus of this kind has the advantage, as compared with the beam splitters predominantly used in the existing art, that the spectral components to be delivered to the detectors can be modified in simple fashion by shifting the mirror elements. Examples of a mirror slider apparatus of this kind are described in DE 43 30 347 A1 and in DE 100 38 049 A1.

The mirror slider apparatuses have the disadvantage, however, that they are of comparatively complex construction in order to enable the desired flexibility in selecting the spectral light components to be detected. Precisely operating motors are therefore required in order to move the mirror elements into the respectively desired position. Displacement of the mirror elements is moreover comparatively time-consuming.

U.S. Pat. No. 6,396,053 B1 discloses a scanning microscope that contains a light deflection device that delivers the spectral components of a light bundle, spectrally dispersed by a prism, selectably to different detectors. This light deflection device encompasses a micromechanical mirror arrangement having a plurality of mirror actuators that can move individually into different reflection positions. For example, five different reflection positions, and thus five different deflection angles, are provided for each of these mirror actuators, in order to direct the light selectably onto the different detectors. This comparatively large number of different reflection positions that each individual mirror actuator can assume requires precise application of control to the respective mirror actuator; technical implementation of this previously known light deflection device is thereby made difficult.

Regarding the existing art, reference is furthermore made to so-called digital light processing (DLP) systems, which are utilized in projection technology, for example, for video projectors. These DLP systems likewise encompass a micromechanical mirror arrangement having a plurality of mirror actuators arranged in the form of a matrix. For each of these mirror actuators, however, provision is made only for exactly two reflection positions, between which the mirror actuator can move back and forth up to several thousand times per second. Each mirror actuator can represent one image point or pixel, the brightness of which is adjusted over the entire time during which the respective mirror actuator is located, within a predetermined time interval, in the one or the other reflection position.

Because of the short switching times, it would be desirable also to use the DLP technology explained above, for example, in confocal microscopy in order to deflect detected light onto different detectors. The only way to implement these short switching times, however, is by providing only exactly two defined reflection positions, which ultimately also make possible only two different deflection directions. In typical confocal applications, however, the deflection of light in more than two directions is desirable.

SUMMARY OF THE INVENTION

An object of the invention is to further develop a light deflection device of the kind recited initially so as to make possible, with simple technical means, rapid and precise switching of the deflection directions.

The invention achieves this object in accordance with Claim 1 by means of a back-reflection structure, systematically adapted to the mirror arrangement, for reflecting back onto another portion of the mirror actuators, in targeted fashion, the light reflected onto the back-reflection structure from one portion of the mirror actuators.

The invention thus provides, in addition to the micromechanical mirror arrangement, a back-reflection structure which is adapted to the mirror arrangement in such a way that different deflection pathways for light can be implemented within the deflection device as a function of the different reflection positions of the mirror actuators, with the result that the light deflection brought about by the device according to the present invention can be controlled as desired. For this purpose, the back-reflection structure is arranged with respect to the mirror arrangement in such a way that it makes available, in interaction with the mirror actuators constituting the mirror arrangement, the desired deflection paths, which can be selected freely by means of a corresponding application of control to the mirror actuators. A "systematic adaptation" of the back-reflection structure to the mirror arrangement thus means a suitable spatial arrangement of the back-reflection structure relative to the mirror arrangement, by means of which the different deflection paths can be established.

The back-reflection structure according to the present invention can thus be embodied so that as a function of the reflection positions of the mirror actuators, multiple reflections between the mirror actuators and the back-reflection structure are possible, in the manner of a mirror cascade. It is conceivable, for example, for a respective mirror actuator, in a first reflection position, to send the light reflected onto it by the back-reflection structure back onto the back-reflection structure, and thus to retain the light within the unit constituted by the mirror arrangement and the back-reflection structure, while in a second reflection position it reflects the light out of that unit. Application of this principle allows the light deflection to be varied within broad limits.

The micromechanical mirror arrangement used is preferably a DLP module, in which the mirror actuators can be individually controlled with very short switching times that are on the order of milliseconds. The individual mirror actuators usually have edge lengths that are in a range of a few micrometers or hundred micrometers. A micromechanical mirror arrangement of this kind thus makes possible variable light deflection at high resolution in terms of space and time. In addition, it can be produced economically in the form of a compact MOEM component that has a long service life and is largely insensitive to temperature fluctuations and atmospheric moisture. The invention thereby makes available a digital light selector that operates precisely and rapidly.

Because the back-reflection structure, in interaction with the mirror arrangement constituted from the mirror actuators, makes possible multiple reflections within the device according to the present invention, the mirror actuators can also have only a few, preferably only exactly two, defined reflection positions in order to implement the desired plurality of deflection paths in the device. This simplifies the application of control to the mirror actuators, and moreover increases the precision with which light can be deflected.

The principle of the present invention—utilizing multiple reflections with incorporation of the back-reflection structure—encompasses an arbitrary reversibility of the light path on which the light is deflected. The device according to the present invention can thus be used, for example, to switch light that is emitted from different spatially distributed light sources in a (single) predetermined direction. It is likewise conceivable to switch light deriving from a single light source in different directions. Mixed forms of these two deflection principles recited above are also conceivable.

The mirror actuators are preferably elements of identical design having identical dimensions. They can, however, also have different dimensions, for example if the light-deflecting system according to the present invention has arranged in front of it a prism that spectrally disperses the light and thus converts it into a light bundle that diverges in wavelength-dependent fashion. In this case the wavelength-dependent spreading of the light bundle can be taken into account by a corresponding adaptation of the size of the individual mirror actuators.

The interaction according to the present invention of the rapidly switchable mirror actuators and the back-reflection structure facing toward them makes possible a flexible adaptation of the deflection device to the deflection geometry present in each case. It is conceivable, for example, for light firstly to strike the mirror arrangement centrally, and then to be conveyed alternatively in two directions by multiple reflections before emerging from the device. Light can likewise firstly strike the mirror arrangement at the edge, and then be conveyed in a predetermined direction. Further, the light to be directed can also be constituted from multiple light beams that are incident onto the deflection device all at the same angle or at different angles. The light beams reflected away from the deflection device can likewise have the same exit angles or different exit angles.

A preferred embodiment, in which the mirror actuators are each controllable into exactly two reflection positions, provides two stops for each mirror actuator in order to define the two reflection positions. The result is that the mirror actuators can be respectively switched rapidly and precisely into the desired reflection position in order to achieve the desired light deflection.

The back-reflection structure is preferably embodied in stationary fashion. The combination of switchable mirror actuators and the stationary back-reflection structure is favorable to particularly simple control of the micromechanical mirror arrangement in order to achieve the desired light deflection. Alternatively, the back-reflection structure can also be made up of movable elements. It is possible in particular also to provide a micromechanical mirror arrangement for the back-reflection structure.

In a preferred embodiment, the mirror actuators form multiple mirror rows lying parallel to one another. Each of these mirror rows can be used, for example, to deflect a specific spectral component of the light, or light beams incident from different directions, in the desired fashion.

The mirror actuators arranged in the respective mirror row have in their reflection positions, for example, identical tilt angles relative to a common reference plane of the mirror arrangement. The provision of identical tilt angles simplifies the construction of the micromechanical mirror arrangement.

Alternatively, however, the mirror actuators arranged in the respective mirror row can also each have, in their reflection positions, different tilt angles relative to a common reference plane of the mirror arrangement. It is thereby possible, for example, when light enters in centered fashion, to implement the multiple reflections in the unit constituted from the mirror arrangement and the back-reflection structure in such a way that all possible exit regions have the same light exit angle.

In a preferred embodiment, the back-reflection structure comprises multiple reflection elements and multiple transparent transmission elements, at least one of the transmission elements constituting a light entry region for the light to be deflected, while the other transmission elements constitute light exit regions for the light reflected at the mirror actuators. The light entering the light entry region is, in this context, selectably deflectable into one of the light exit regions as a function of the reflection positions of the light-reflecting mirror actuators. In this embodiment, the reflection elements in interaction with the mirror actuators provide for the multiple reflections within the unit constituted from the mirror arrangement and the back-reflection structure, while the transparent transmission elements make possible light entry into, and light exit from, that unit.

The reflection elements and the transmission elements are preferably arranged parallel to one another and alternatingly. The reflection elements and the transmission elements here constitute a kind of strip-shaped back-reflection pattern that can be adapted as desired to the geometry of the mirror arrangement, in which the mirror actuators are preferably arranged in parallel mirror rows.

In a preferred embodiment, the light entry region is arranged centeredly between the light exit regions. This configuration is usable, for example, when a central light incidence and a subsequent deflection from the center toward the edges of the device is desired. It is likewise conceivable, however, for the light entry region to be provided at the edge of the device, so that light is then redirected away from that edge in a predetermined direction.

The reflection elements and the transmission elements are preferably arranged in a plane spaced away from the mirror arrangement and extend, as projected onto the mirror arrangement, orthogonally to the mirror rows. In this configuration the elements constituting the back-reflection structure and the mirror rows are therefore arranged, so to speak, crosswise. This makes possible particularly simple systematic adaptation of the back-reflection structure to the mirror arrangement, for example in order to bring about the desired multiple reflections upon deflection of a light bundle that diverges as a result of spectral spreading.

By preference, at least one of the mirror actuators in the respective mirror row is directed, as projected onto the back-reflection structure, onto one of the transmission elements. In this embodiment the mirror actuators are, for example each arranged beneath one of the transmission elements that can serve as light entry regions or light exit regions. This makes possible a perpendicular light incidence into, or perpendicular light exit from, the deflection device; this simplifies, for example, alignment of the deflection device onto a light source or a detector.

A housing in which the mirror arrangement is accommodated, and a transparent cover which is mounted on the housing and on which the back-reflection structure is embodied, are preferably provided. The transparent cover is, for example, a glass plate on which the back-reflection structure is embodied in the form of a reflective coating. The back-reflection structure is preferably located on the underside of the cover facing toward the mirror arrangement. This is favorable to loss-free multiple reflections between the mirror arrangement and the back-reflection structure. The back-reflection can also, however, be arranged on the upper side of the cover, or outside the cover. The transparent cover is preferably anti-reflection-coated on both sides, so that undesired multiple reflections between the mirror arrangement and the back-reflection structure are avoided.

In a particularly preferred embodiment, a dispersion element is provided which, by spectral dispersion of the light, generates a light entry bundle in such a way that the light entry bundle has a light bundle cross section, elongated by the spectral dispersion, with which the light entry bundle is incident through the light entry region orthogonally to the mirror rows onto the mirror arrangement, the mirror rows each having a predetermined spectral region of the light entry bundle assigned to them. This embodiment can be profitably used in particular in a confocal microscope, so that the mirror slider apparatuses hitherto used therein can be replaced with the deflection device according to the present invention which makes possible particularly rapid and precise deflection of various spectral components of the light, for example onto different detectors. In this context, each mirror row receives a predetermined spectral region of the light entry bundle, which can then be directed, independently of the other spectral regions, selectably in a desired deflection direction.

The mirror rows are preferably grouped together into multiple groups that each generate, by deflection of the light entry bundle, an exit light bundle of a predetermined spectral composition that exits from one of the light exit regions. The fact that the mirror rows are combined into multiple (including non-continuous) groups, each individual group of which generates a light exit bundle of predetermined spectral composition deflected in a specific direction, allows the deflected light to be distributed as desired onto different detectors as a function of its spectral composition. In particular, in contrast to the mirror slider apparatuses hitherto used, it is no longer necessary for a contiguous wavelength region to be assigned to the individual detectors. In the fluorescence microscopy application, for example, it is possible to direct the entire fluorescence band onto a single detector, and at the same time to "cut out" from it the excitation wavelengths located in it. The deflection device according to the present invention further has the advantage, as compared with known mirror slider apparatuses, that each mirror actuator has assigned to it a fixed wavelength region that does not change in the context of a change in the wavelength assignment to specific detectors. Conversely, with mirror slider apparatuses in which the mirror pairs are moved in motorized fashion, individual motor steps can "get lost," resulting in a shift of the spectrum.

The device preferably encompasses multiple detectors each for sensing at least one of the exit light bundles. As already indicated above, it is not necessary, for utilization of the deflection device according to the present invention, for the wavelength regions assigned to the individual detectors to be continuous, i.e. monotonically rising or falling. If a specific detector is particularly well suited for a specific application, for example in fluorescence lifetime microscopy or fluorescence correlation spectroscopy and/or when a specific method is being used, for example a gating method, it can then have any desired wavelength region assigned to it, regardless of where the detector is located in the system in question. This means that the device according to the present invention is capable of assigning each wavelength to the detector best suited for it.

According to a further aspect of the invention, an optical device, in particular a microscope and particularly preferably a confocal microscope, is provided, which device is equipped with a device of the kind described above for variable deflection of light.

BRIEF DESCRIPTION OF THE DRAWINGS

The invention will be described below in terms of an exemplifying embodiment, with reference to the Figures, in which.

DETAILED DESCRIPTION OF THE PREFERRED EMBODIMENTS

Figure 1:
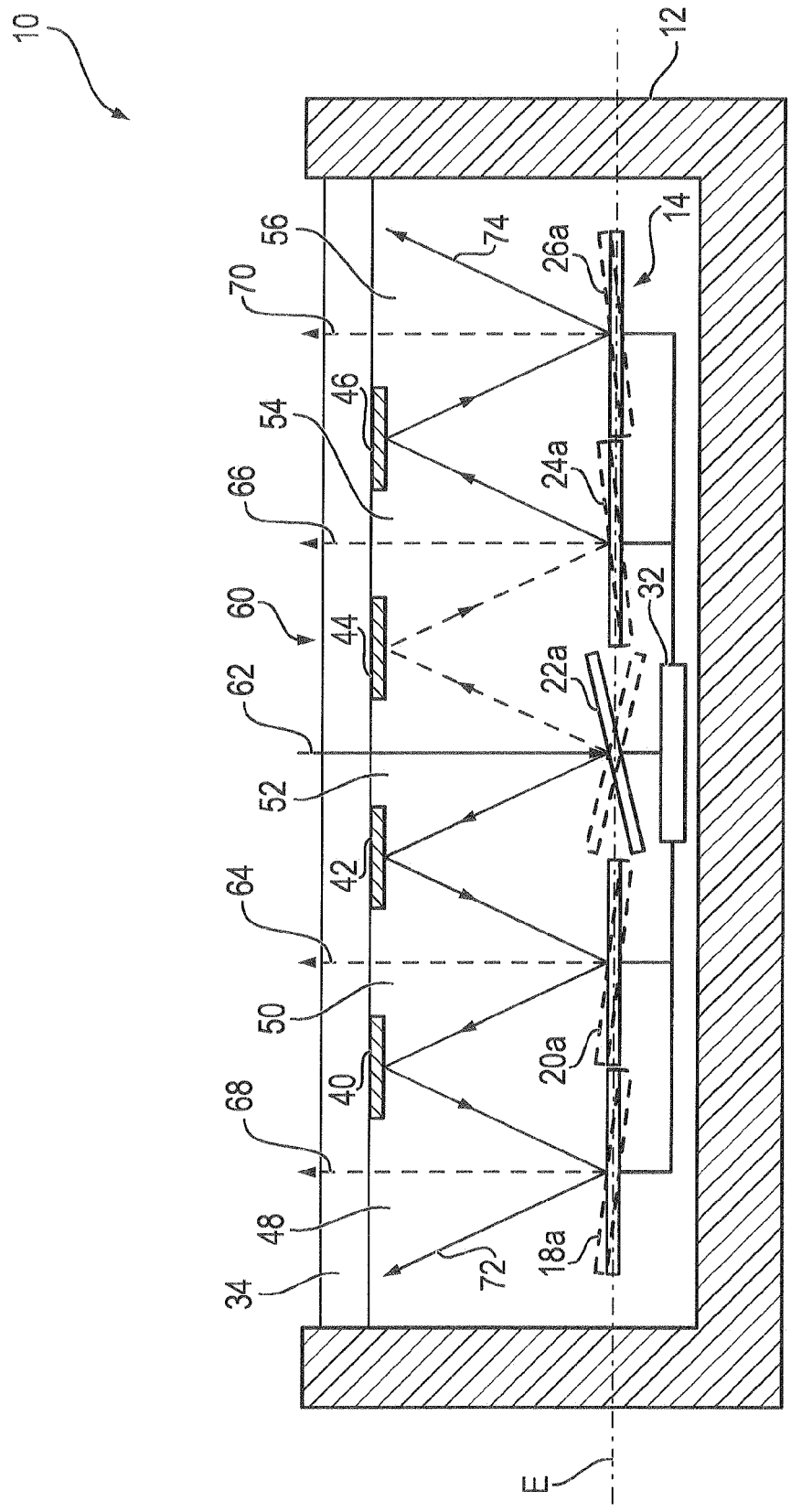
FIG. 1 is a sectioned side view of a deflection unit that is part of a deflection device according to the present invention.
Figure 2:
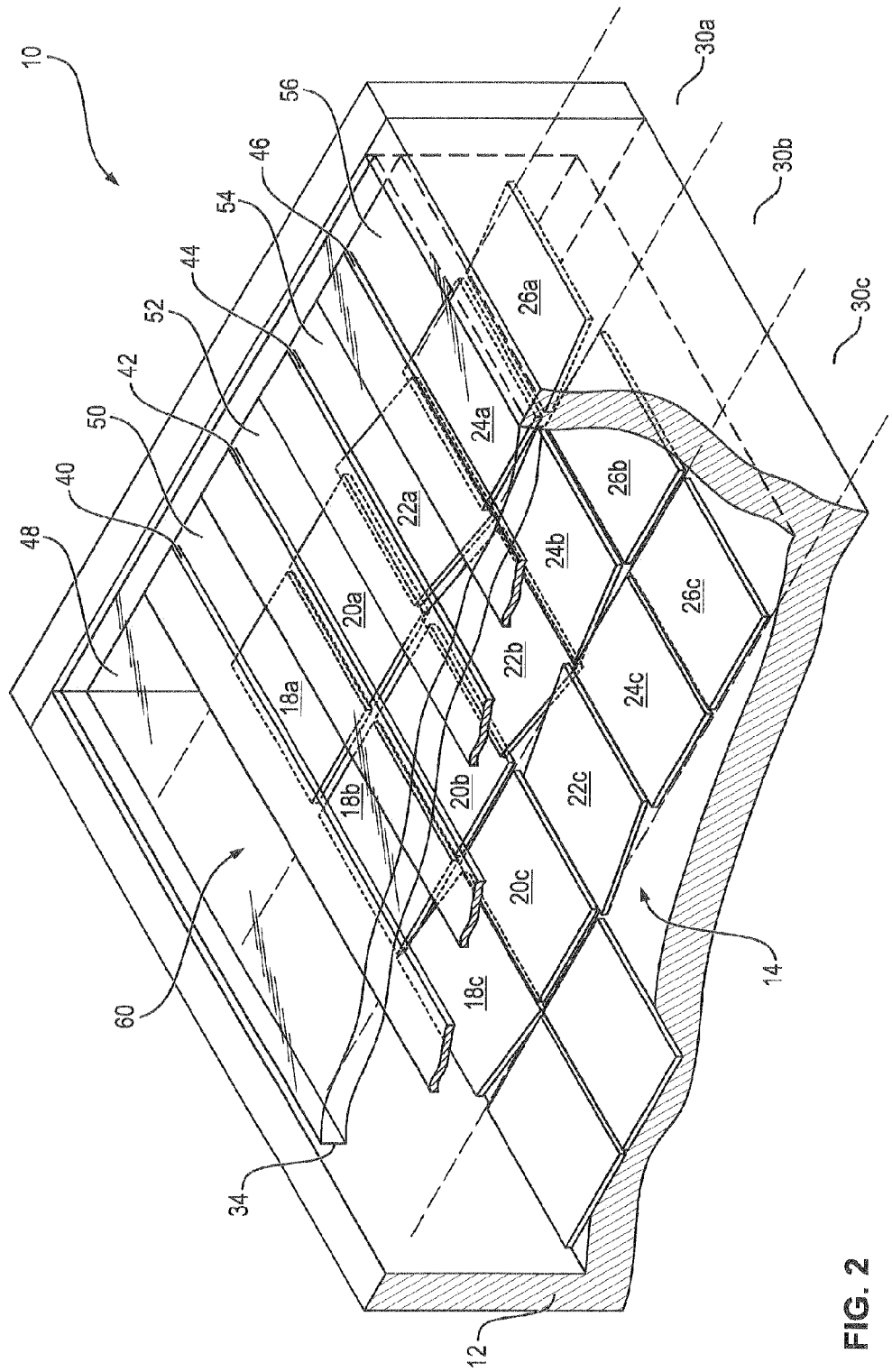
FIG. 2 is a perspective plan view of the deflection unit.

FIGS. 1 and 2 show deflection unit 10 in a sectioned side view and a plan view, respectively. Deflection unit 10 is part of a device that is used, for example, in a confocal microscope in order to deliver spectrally separated light to different detectors.

Detection unit 10 has a housing 12 in which a micromechanical mirror arrangement 14 is accommodated. Mirror arrangement 14 is, for example, a DLP component, and is made up of a plurality of mirror actuators arranged in a matrix shape, of which, purely by way of example, FIG. 1 depicts five actuators labeled 18a to 26a, and FIG. 2 depicts fifteen actuators labeled 18a to 26a, 18b to 26b, and 18c to 26c. Be it noted in this context that the depictions in FIGS. 1 and 2 serve merely for illustration. Considerably more mirror actuators are provided in a practical implementation, for example (depending on the application) in a range from several hundred to several thousand actuators. As shown in the perspective plan view of FIG. 2, the mirror actuators form mirror rows arranged parallel to one another, of which once again only three rows, labeled 30a, 30b, and 30c, are depicted in FIG. 2.

The statements that follow relate to mirror row 30a formed from mirror actuators 18a to 26a. These statements apply correspondingly to the other mirror rows.

Mirror actuators 18a to 26a are each independently tiltable relative to a common reference plane E of mirror arrangement 14. Provided for each mirror actuator 18a to 26a are two stops (not shown in FIG. 1) that define two different reflection positions of the respective mirror actuator 18a to 26a. In FIG.

1, one of the two reflection positions is in each case illustrated with a solid line, and the other with a dashed line. As is further evident from FIG. 1, mirror actuators 18a to 26a have, in their respective reflection positions, different tilt angles relative to reference plane E. A control unit 32 is provided for applying control to mirror actuators 18a to 26a, which unit can cause each individual mirror actuator 18a to 26a to be impinged upon by a, for example, electrostatic displacement force in order to switch over the respective mirror actuator 18a to 26a between its two defined reflection positions.

A cover glass 34 that covers housing 12 is mounted on the upper side of housing 12. Embodied on the lower side, facing toward mirror arrangement 14, of cover glass 34 are elongated reflection elements 40, 42, 44, and 46 that are arranged parallel to one another and, as projected onto mirror arrangement 14, extend orthogonally to mirror rows 30a, 30b, and 30c. In the present exemplifying embodiment, reflection elements 40, 42, 44, and 46 are reflective coatings that are evaporatively deposited onto cover glass 34. Between reflection elements 40, 42, 44, and 46 and on the edges of cover glass 34 (see FIG. 2) are regions that do not have a reflective coating. These regions, labeled 48, 50, 52, 54, and 56 in FIG. 1, are consequently transparent, and are referred to hereinafter as transmission elements. As shown in FIG. 2, transmission elements 48 to 56 also extend, as projected onto mirror arrangement 14, orthogonally to mirror rows 30a, 30b, and 30c.

Reflection elements 40 to 46 and transmission elements 48 to 56 constitute a back-reflection structure, labeled generally as 60 in FIG. 1, which serves to make possible within deflection unit 10, by multiple reflections of the incident light, different deflection paths for deflecting the light in a desired fashion. The interaction of the displaceable mirror actuators 18a to 26a and the back-reflection structure 60 facing toward them is explained below with reference to FIG. 1.

In the example shown in FIG. 1, deflection unit 10 is intended to deflect perpendicularly incident light selectably to different exit regions. It is assumed for the present example that the light enters, in the form of an entry light bundle 62, into an elongated central light entry region that is constituted by transmission element 52. Entry light bundle 62 is incident, inter alia, onto mirror actuator 22a which, depending on its reflection position, directs the light either onto reflection element 42 (to the left in FIG. 1) or onto reflection element 44 (to the right in FIG. 1). The light incident onto reflection element 42 or reflection element 44 is then reflected back to mirror actuator 20a or mirror actuator 24a, respectively. The respective mirror actuator 20a or 24a then, depending on its reflection position, directs the light either onto reflection element 40 or 46, respectively, or onto the respective transparent region 50 or 54 through which the light exits from deflection unit 10. The two exit possibilities recited above are illustrated in FIG. 1 by exit light bundles 64 and 66.

Further exit light bundles 68, 70, 72, and 74 can be generated in corresponding fashion by the arrangement shown in FIG. 1 as a function of the reflection positions of the further mirror actuators 18a and 26a.

Mirror row 30a, depicted in section in FIG. 1 and constituted by mirror actuators 18a to 26a, is thus, in interaction with back-reflection structure 60 facing toward it, capable of selectably generating one of the exit light bundles 64 to 70 from entry light bundle 62. The same is correspondingly true of mirror rows 30b and 30c shown in FIG. 2. Each mirror row 30a, 30b, 30c can thus deflect the light incident onto it, depending on the reflection positions of its mirror actuators, selectably in one of several possible directions.

In the present exemplifying embodiment, each mirror row 30a, 30b, 30c has assigned to it a predetermined wavelength region of the incident light. Deflection unit 10 is thereby capable of deflecting the light in different directions as a function of wavelength. This application is illustrated again in FIG. 3.

Figure 3:
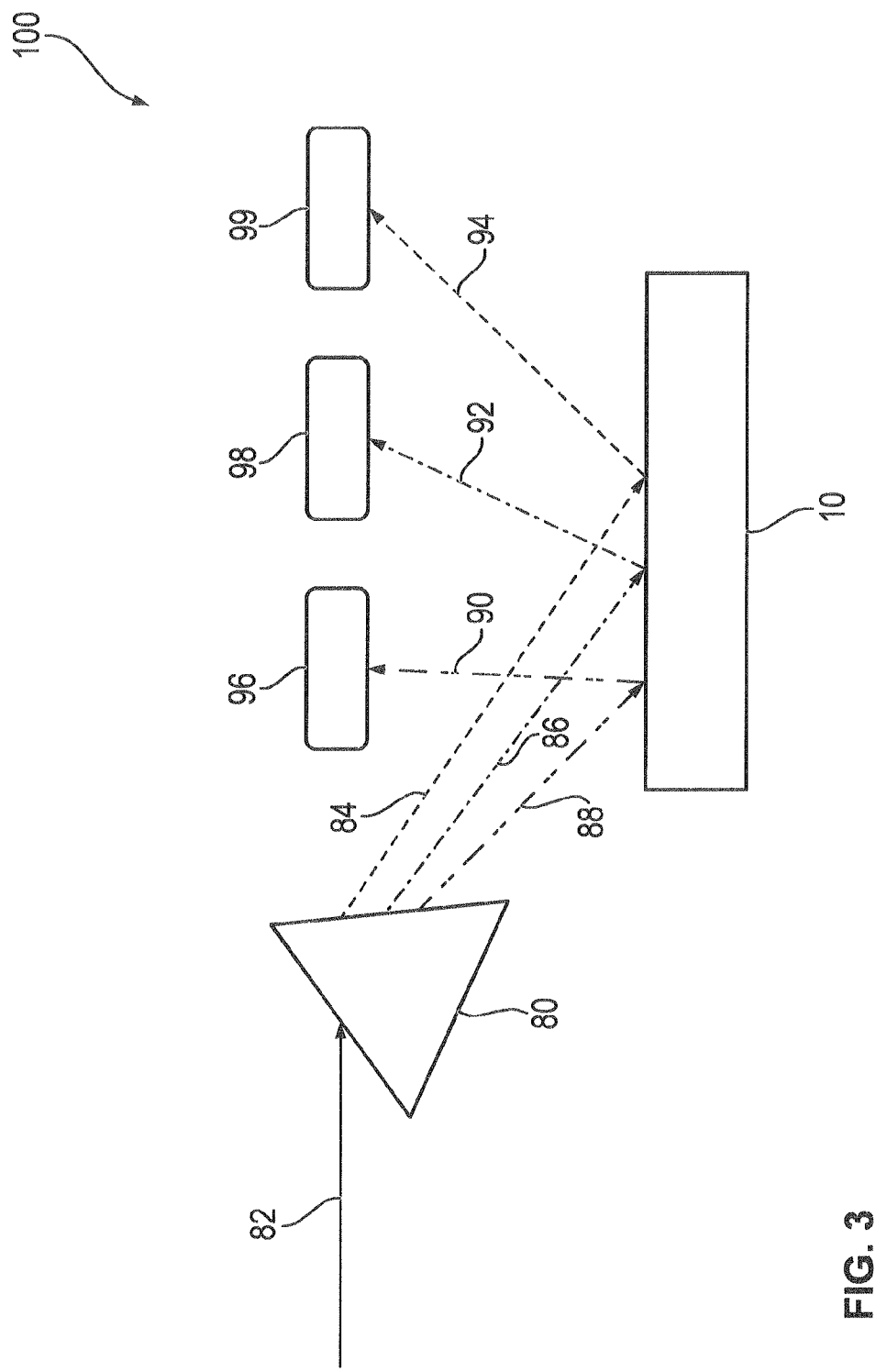
FIG. 3 is a schematic depiction to illustrate an example of how the deflection device according to the present invention is used.

FIG. 3 schematically shows a deflection device, labeled in general as 100, in which a prism 80 is arranged in front of deflection unit 10. Prism 80 serves to spectrally disperse an incident light bundle 82 and thus to generate a divergent light bundle that has a light bundle cross section which is elongated as a result of the spectral dispersion. In FIG. 3, this spectrally dispersed light bundle cross section is illustrated by three sub-bundles 84, 86, and 88, each of which is intended to represent a spectral component of light bundle 82.

The three sub-bundles 84, 86, and 88 are incident onto deflection unit 10, which ensures that sub-bundles 84, 86, and 88 are deflected in different directions. In the example shown in FIG. 3, sub-bundle 84 is intended to be converted into an exit light bundle 90, sub-bundle 86 into an exit light bundle 92, and sub-bundle 88 into an exit light bundle 94. Exit light bundles 90, 92, and 94 are each selectably delivered by deflection unit 10 to one of several detectors 96, 98, 99. In the example depicted in FIG. 3, one of the exit light bundles 90, 92, and 94 is respectively incident onto one of the detectors 96, 98, and 99. This is to be understood, however, merely as an example. It is also possible, for example, for two of the three exit light bundles 90, 92, and 94 to be directed onto one and the same detector.

In order to generate exit light bundles 90, 92, and 94 in the manner illustrated in FIG. 3, the mirror rows can be grouped together in any desired combinations into groups that respectively generate one of the exit light bundles 90, 92, and 94. Provision is made in the present example that the light entry bundle constituted by sub-bundles 84, 86, and 88 is incident, with its longitudinal bundle cross section generated by the spectral dispersion, in an orthogonal orientation onto the mirror rows.

PARTS LIST

10 Deflection unit
12 Housing
14 Mirror arrangement
18a to 26a Mirror actuators
18b to 26b Mirror actuators
18c to 26c Mirror actuators
30a to 30c Mirror rows
32 Control unit
34 Cover glass
40, 42, 44, 46 Reflection elements
48, 50, 52, 54, 56 Transmission elements
60 Back-reflection structure
62 Entry light bundle
64, 66, 68, 70, 72, 74 Exit light bundles
80 Prism
82 Light bundle
84, 86, 88 Sub-bundles
90, 92, 94 Exit light bundles
96, 98, 99 Detectors
100 Deflection device

What is claimed is:
1. A device for variable deflection of light, encompassing a micromechanical mirror arrangement having a plurality of light-reflecting mirror actuators, and a control unit with which the mirror actuators are controllable into different reflection positions in order to vary the light deflection, characterized by a back-reflection structure, systematically adapted to the mirror arrangement, for reflecting back onto another portion of the mirror actuators, in targeted fashion, the light reflected onto the back-reflection structure from one portion of the mirror actuators;

wherein the back-reflection structure comprises multiple reflection elements and multiple transparent transmission elements, at least one of the transmission elements constituting a light entry region for the light to be deflected, while the other transmission elements constitute light exit regions for the light reflected at the mirror actuators, and the light entering the light entry region is selectably deflectable into one of the light exit regions as a function of the reflection positions of the light-reflecting mirror actuators.

2. The device according to claim 1, wherein the mirror actuators are each controllable into exactly two reflection positions.

3. The device according to claim 2, wherein two stops are provided for each mirror actuator in order to define the two reflection positions.

4. The device according to claim 1, wherein the back-reflection structure is embodied in stationary fashion.

5. The device according to claim 1, wherein the mirror actuators form multiple mirror rows lying parallel to one another.

6. The device according to claim 5, wherein the mirror actuators arranged in the respective mirror row have, in their reflection positions, identical tilt angles relative to a common reference plane (E) of the mirror arrangement.

7. The device according to claim 5, wherein the mirror actuators arranged in the respective mirror row each have, in their reflection positions, different tilt angles relative to a common reference plane (E) of the mirror arrangement.

8. The device according to claim 5, wherein at least one of the mirror actuators arranged in the respective mirror row has, in its reflection positions, tilt angles of different magnitudes relative to a common reference plane (E) of the mirror arrangement.

9. The device according to claim 1, wherein the reflection elements and the transmission elements are arranged parallel to one another and alternatingly.

10. The device according to claim 9, wherein the light entry region is arranged centeredly between the light exit regions.

11. The device according to claim 9, wherein the reflection elements and the transmission elements are arranged in a plane spaced away from the mirror arrangement and extend, as projected onto the mirror arrangement orthogonally to the mirror rows.

12. The device according to claim 11, wherein at least one of the mirror actuators in the respective mirror row is directed, as projected onto the back-reflection structure, onto one of the transmission elements.

13. The device according to claim 1, characterized by a housing in which the mirror arrangement is accommodated, and by a transparent cover which is mounted on the housing and on which the back-reflection structure is embodied.

14. The device according to claim 1, characterized by a dispersion element for generating a light entry bundle by spectral dispersion of the light in such a way that the light entry bundle has a light bundle cross section, elongated by the spectral dispersion, with which the light entry bundle is incident through the light entry region orthogonally to the mirror rows onto the mirror arrangement, the mirror rows each having a predetermined spectral region of the light entry bundle assigned to them.

15. The device according to claim 14, wherein the mirror rows have different sizes.

16. The device according to claim 14, wherein the mirror rows are grouped together into multiple groups that each generate, by deflection of the light entry bundle, an exit light bundle of a predetermined spectral composition that exits from one of the light exit regions.

17. The device according to claim 16, characterized by multiple detectors each for sensing at least one of the exit light bundles.

18. The device for variable deflection of light according to claim 1, wherein the device is disposed in a microscope.

* * * * *